(12) United States Patent
Hong et al.

(10) Patent No.: US 7,502,163 B1
(45) Date of Patent: Mar. 10, 2009

(54) METHOD FOR PREPARING A POLED STRUCTURE BY USING LEAKAGE AND TUNNEL EFFECTS

(75) Inventors: Tsai Hau Hong, Hsinchu (TW); Tze Chia Lin, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 0 days.

(21) Appl. No.: 11/938,738

(22) Filed: Nov. 12, 2007

(51) Int. Cl.
*G02F 1/35* (2006.01)
(52) U.S. Cl. ........................ 359/326; 359/332
(58) Field of Classification Search .......... 359/321, 359/326–332; 385/122
See application file for complete search history.

(56) References Cited
U.S. PATENT DOCUMENTS

| | | | |
|---|---|---|---|
| 6,002,515 A | 12/1999 | Mizuuchi et al. | |
| 6,353,495 B1 | 3/2002 | Mizuuchi et al. | |
| 7,145,714 B2 * | 12/2006 | Roberts et al. | 359/326 |
| 7,230,753 B2 * | 6/2007 | Mizuuchi et al. | 359/321 |
| 2007/0258131 A1 * | 11/2007 | Yamaguchi et al. | 359/326 |

* cited by examiner

*Primary Examiner*—Hemang Sanghavi
(74) *Attorney, Agent, or Firm*—WPAT, P.C.; Anthony King (57) ABSTRACT

A method for preparing a poled structure forms a ferroelectric substrate with a first polarization direction, wherein the ferroelectric substrate has a first surface and a second surface. An electrode-patterning process is then performed to form a first electrode structure on the first surface, and the first electrode structure includes a plurality of active blocks and a plurality of passive blocks, wherein at least one passive block is sandwiched between two active blocks. Subsequently, a poling process is performed including applying a predetermined voltage to the active blocks and floating the passive blocks such that a current such as a leakage current or a tunnel current is generated from the active blocks to the passive blocks to form a plurality of inverted domains with a second polarization direction in the ferroelectric substrate.

24 Claims, 9 Drawing Sheets

METHOD FOR PREPARING A POLED STRUCTURE BY USING LEAKAGE AND TUNNEL EFFECTS

BACKGROUND OF THE INVENTION (A) Field of the Invention

The present invention relates to a method for preparing a poled structure, and more particularly, to a method for preparing a poled structure by leakage and tunnel effects.

(B) Description of the Related Art

Poled structures having poled domains in a ferroelectric single crystal such as lithium niobate ($LiNbO_3$), lithium tantalite ($LiTaO_3$) and potassium titanyl phosphate ($KTiOPO_4$) is widely used in optical fields such as optical communications, optical storage and optical measurement. There are several methods for preparing the poled structure such as the proton-exchanging method, the electron beam-scanning method, the electric voltage application method, etc.

U.S. Pat. No. 6,002,515 discloses a method for manufacturing a polarization inversion part on a ferroelectric crystal substrate. The polarization inversion part is prepared by steps of applying a voltage in the polarization direction of the ferroelectric crystal substrate to form a polarization inversion part, conducting a heat treatment for reducing the internal electric field generated in the substrate by the applied voltage, and then reinverting polarization in a part of the polarization inversion part by applying a reverse direction voltage against the voltage that was previously applied. In other words, the method for preparing a polarization inversion part disclosed in U.S. Pat. No. 6,002,515 requires applying electric voltage twice.

U.S. Pat. No. 6,353,495 discloses a method for forming an optical waveguide element. The disclosed method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

However, it becomes very difficult to uniformly control the width of the inverted domain in the ferroelectric substrate as the period of the inverted domain becomes smaller and smaller.

SUMMARY OF THE INVENTION

One aspect of the present invention provides a method for preparing a poled structure by leakage and tunnel effects, which can prepare the poled structure having a very small period with excellent domain-spreading controllability.

A method for preparing a poled structure according to this aspect of the present invention first forms a ferroelectric substrate with a first polarization direction, wherein the ferroelectric substrate has a first surface and a second surface. An electrode-patterning process is then performed to form a first electrode structure on the first surface, such that the first electrode structure includes a plurality of active blocks and a plurality of passive blocks, wherein at least one passive block is sandwiched between two active blocks. Subsequently, a poling process is performed including applying a predetermined voltage to the active blocks and floating the passive blocks such that a current is generated from the active blocks to the passive blocks to form a plurality of inverted domains with a second polarization direction in the ferroelectric substrate.

Another aspect of the present invention provides a method for preparing a poled structure, which first forms a ferroelectric substrate with a first polarization direction, wherein the ferroelectric substrate has a first surface and a second surface. An electrode-patterning process is performed to form a first electrode structure on the first surface, such that the first electrode structure includes at least two active bodies and a plurality of passive blocks with two free ends facing the two active blocks. Subsequently, a poling process is performed including applying a predetermined voltage to the active bodies and floating the passive blocks such that a current is generated from the active bodies to the free ends of the passive blocks to form a plurality of inverted domains with a second polarization direction in the ferroelectric substrate.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
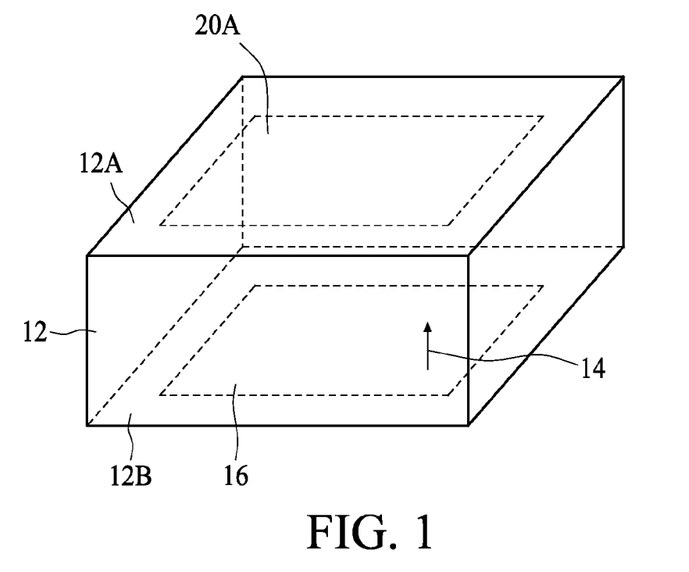
FIG. 1 to FIG. 4 illustrate a method for preparing a poled structure according to a first embodiment of the present invention.
Figure 2:
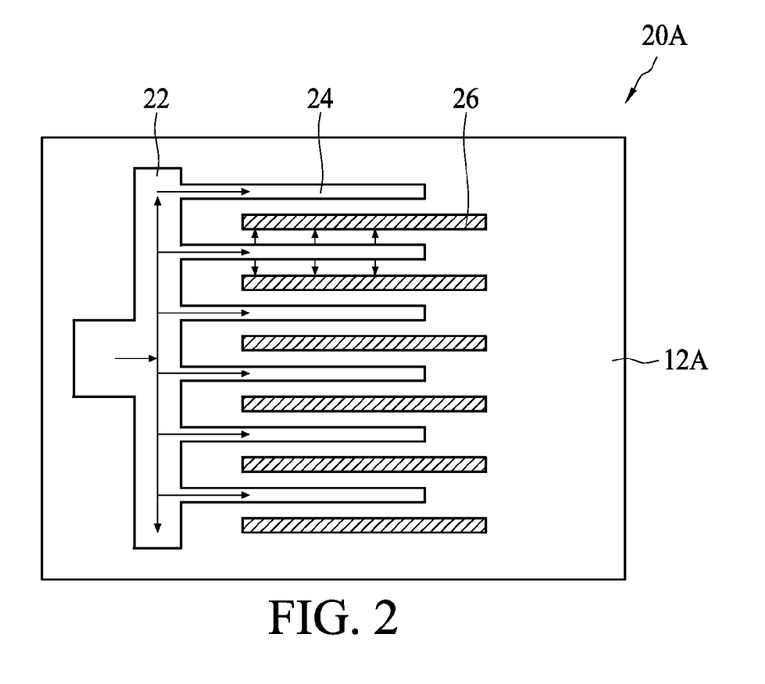

FIG. 1 to FIG. 4 illustrate a method for preparing a poled structure 10 according to a first embodiment of the present invention. The method first provides a ferroelectric substrate 12 with a first polarization direction 14 having a top surface 12A and a bottom surface 12B. An electrode-patterning process including metal deposition, photolithographic and etching processes is then performed to form a first electrode structure 20A on the top surface 12A and a second electrode structure 16 on the bottom surface 12B. The first electrode structure 20A includes a first body 22, a plurality of active blocks 24 with one end connected to the first body 22 and a plurality of passive blocks 26, and at least one passive block 26 is sandwiched between two active blocks 24, as shown in FIG. 2. Preferably, the active blocks 24 on the first surface 12A are strip-shaped and formed in an equally-spaced manner, and the passive blocks 26 on the first surface 12A can also be strip-shaped and formed in an equally-spaced manner.

Figure 3:
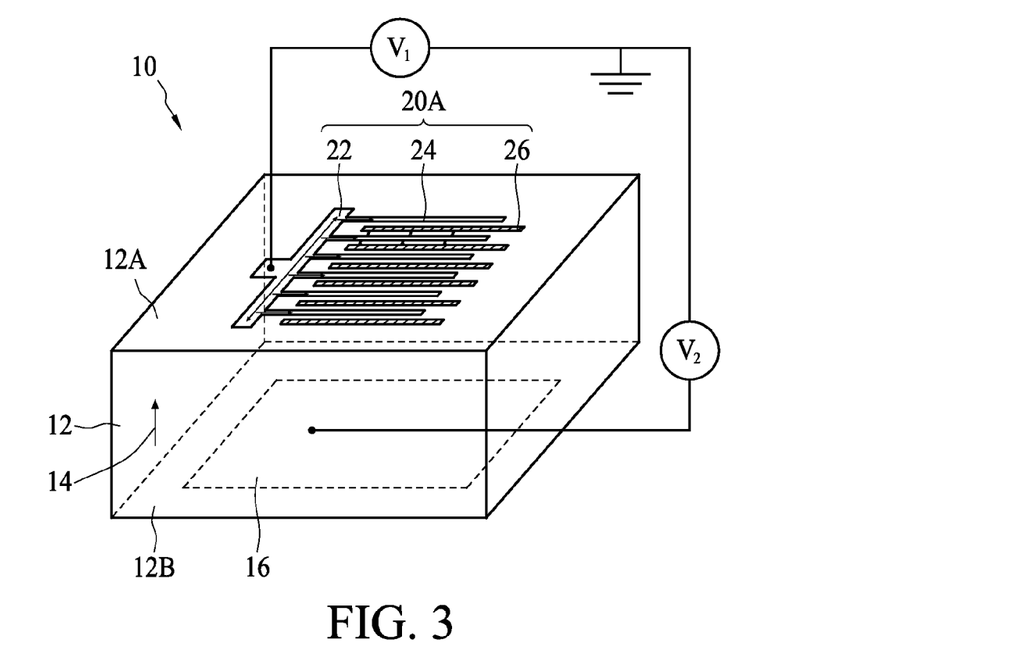
Figure 4:
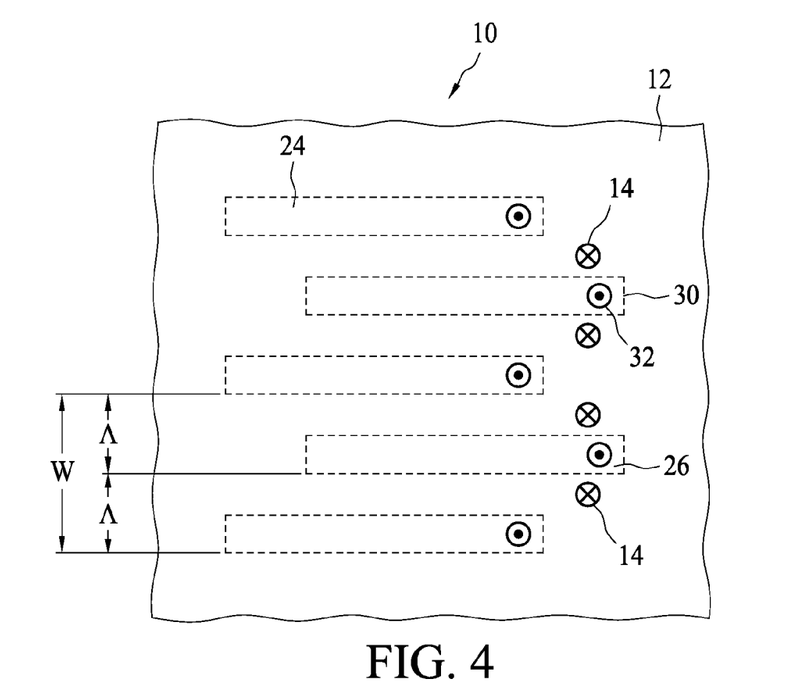

Referring to FIG. 3, a poling process is performed by applying a first voltage ($V_1$) to the active blocks 24 via the first body 22 and a second voltage ($V_2$) to the second electrode structure 16 and by floating the passive blocks 26. The first voltage ($V_1$) is larger than the second voltage ($V_2$). Consequently, leakage current or tunnel current is generated from the active blocks 24 to the passive blocks 26 to form a plurality of inverted domains 30 with a second polarization direction 32 in the ferroelectric substrate 12 to complete the poled structure 10, as shown in FIG. 4.

The inverted domains 30 with the second polarization direction 32 are formed in a portion of the ferroelectric substrate 12 below the active blocks 24 and the passive blocks 26, while the other portion of the ferroelectric substrate 12 not covered by the active blocks 24 and the passive blocks 26 maintains its original polarization direction, i.e., the first polarization direction 14. In particular, the second polarization direction 32 is substantially opposite to the first polarization direction 14. Assuming the width between two active blocks 24 is "W", the period ($\Lambda$) of the inverted domain 30 is $$"\frac{1}{2}W".$$

In contrast, the period ($\Lambda$) of inverted domain would be "W" if the poling process was performed without inserting the passive block 26 between two active blocks 24. In other words, inserting the passive block 26 between two active blocks 24 can decrease the period ($\Lambda$) of the inverted domains 30.

In particular, a portion of the ferroelectric substrate 12 under the active blocks 24 usually starts the domain inversion due to the directly applied electric voltage. During the poling process, the domain inversion starts from the portion of the ferroelectric substrate 12 under the active blocks 24, and after that, the reversed domains start to spread out and extend to another portion of the ferroelectric substrate 12 between the active blocks 24 and passive blocks 26. At that time, the electric field applied to the ferroelectric substrate 12 is reduced by the unscreening charges generated from the domain inversion process of the portion of the ferroelectric substrate 12 between the active blocks 24 and passive blocks 26, thus slowing the domain wall velocity significantly.

The reduced electric field applied to the portion of the ferroelectric substrate 12 close to the active blocks 24 may become smaller than the electric field applied to the ferroelectric substrate 12 under the passive blocks 26 due to the tunnel effect. Therefore, the passive blocks 26 start to compete for the delivered charges with the spreading domain of the active blocks 24, and start its domain inversion process. When the second domain also starts to spread out, the electric field under the active blocks 24 may again become stronger than the passive blocks 26 spreading region, so the active blocks 24 spreading region wins a higher ratio of the delivered charges again. Such competition process limits the domain spreading effect during the poling process so that a better domain controllability can be achieved.

Figure 5:
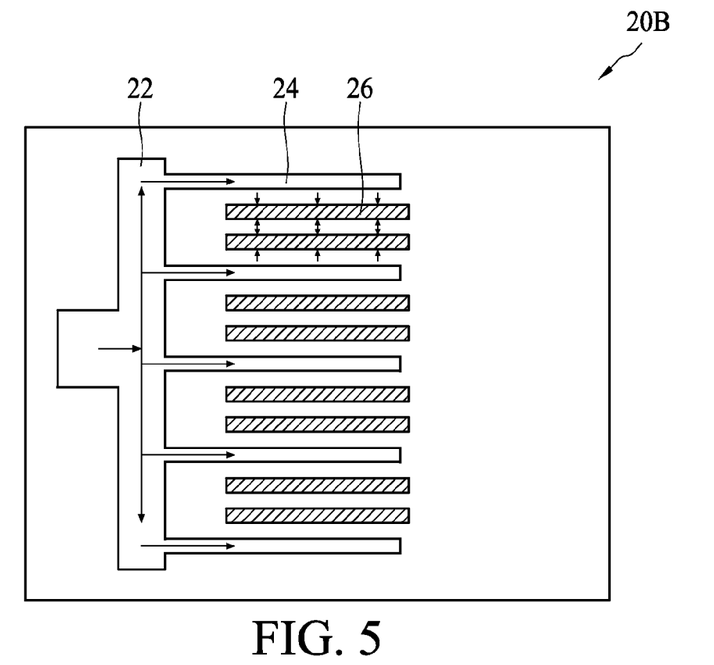
FIG. 5 illustrates a method for preparing the poled structure according to a second embodiment of the present invention.

FIG. 5 illustrates a method for preparing the poled structure 10 according to a second embodiment of the present invention. Compared with the first embodiment using the electrode-patterning process to form the first electrode structure 20A including only one passive block 26 sandwiched between two active blocks 2 as shown in FIG. 2, the second embodiment of the present invention uses the electrode-patterning process to alternatively form a first electrode structure 20B including a first body 22, a plurality of active blocks 24 connected to the first body 22, and a plurality of passive blocks 26 with at least two passive blocks 26 sandwiched between two active blocks 24.

Subsequently, the poling process shown in FIG. 3 is performed to complete the poled structure 10. Assuming the width between two active blocks 24 is "W", the period ($\Lambda$) of the inverted domain 30 is $$"\frac{1}{3}W".$$

In contrast, the period ($\Lambda$) of inverted domain would be "W" if the poling process was performed without inserting the two passive blocks 26 between two active blocks 24. In other words, inserting the two passive blocks 26 between two active blocks 24 can decrease the period ($\Lambda$) of the inverted domains 30.

Figure 6:
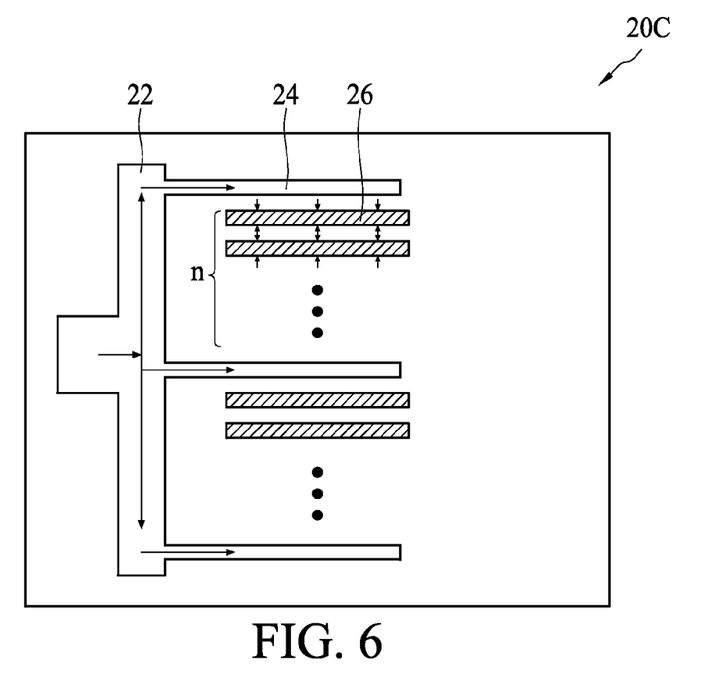
FIG. 6 illustrates a method for preparing the poled structure according to a third embodiment of the present invention.

FIG. 6 illustrates a method for preparing the poled structure 10 according to a third embodiment of the present invention. Compared with the first embodiment using the electrode-patterning process to form the first electrode structure 20A including only one passive block 26 sandwiched between two active blocks 24 as shown in FIG. 2, the third embodiment of the present invention uses the electrode-patterning process to alternatively form a first electrode structure 20C including a first body 22 a plurality of active blocks 24 connected to the first body 22, and n number of passive blocks 26 sandwiched between two active blocks 24.

Subsequently, the poling process shown in FIG. 3 is performed to complete the poled structure 10. Assuming the width between two active blocks 24 is "W", the period ($\Lambda$) of the inverted domain 30 is $$"\frac{1}{n+1}W".$$

In contrast, the period ($\Lambda$) of inverted domain would be $$"\frac{1}{2}W"$$

if the poling process was performed by using the first electrode structure 20B with only one passive block 26 sandwiched between two active blocks 24. In other words, inserting the n number of passive blocks 26 between two active blocks 24 can further decrease the period ($\Lambda$) of the inverted domains 30.

Figure 7:
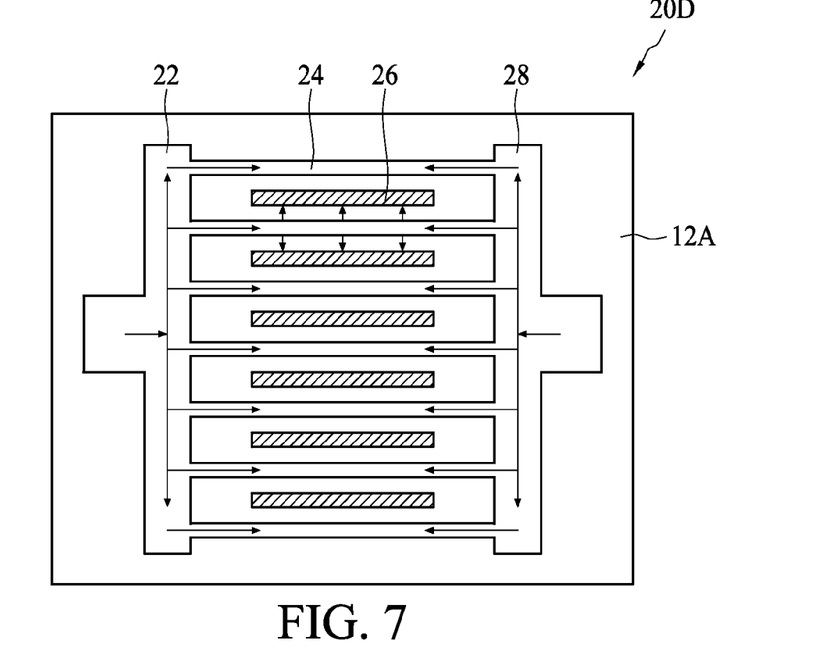
FIG. 7 illustrates a method for preparing a poled structure according to a fourth embodiment of the present invention.

FIG. 7 illustrates a method for preparing the poled structure 10 according to a fourth embodiment of the present invention. Compared with the first embodiment using the electrode-patterning process to form the first electrode structure 20A including the active blocks 24 with only one end connected to the first body 22 as shown in FIG. 2, the fourth embodiment of the present invention uses the electrode-patterning process to alternatively form a first electrode structure 20D including a first body 22, a second body 28, a plurality of active blocks 24 with two ends connected to the first body 22 and the second body 28, and a plurality of passive blocks 26 with at least one passive block 26 sandwiched between two active blocks 24.

Subsequently, the poling process shown in FIG. 3 is performed to complete the poled structure 10. In particular, the introduction of the second body 28 connecting one end of the active blocks 24 and applying the first voltage (V₁) to the active blocks 24 via both the first body 22 and the second body 28 can ensure the active blocks 24 at the same first voltage (V₁), which can generate a more uniform electric field distribution for inverting the polarization direction of the ferroelectric substrate 12.

Figure 8:
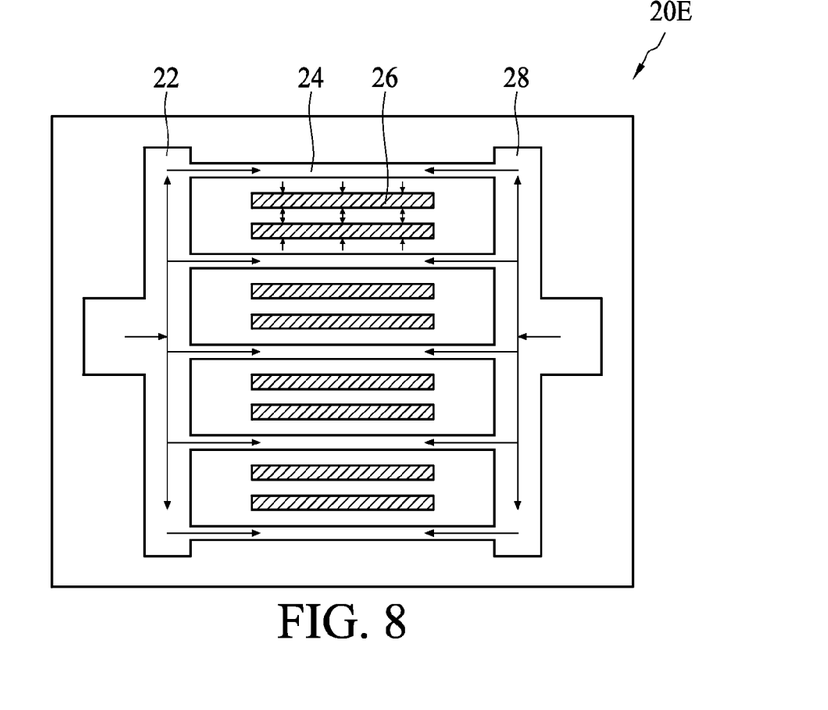
FIG. 8 illustrates a method for preparing a poled structure according to a fifth embodiment of the present invention.

FIG. 8 illustrates a method for preparing the poled structure 10 according to a fifth embodiment of the present invention. Compared with the fourth embodiment using the electrode-patterning process to form the first electrode structure 20E including only one passive block 26 sandwiched between two active blocks 2 as shown in FIG. 5, the fifth embodiment of the present invention uses the electrode-patterning process to alternatively form a first electrode structure 20E including a first body 22, a second body 28, a plurality of active blocks 24 with two ends connected to the first body 22 and the second body 28, and a plurality of passive blocks 26 with at least two passive blocks 26 sandwiched between two active blocks 24.

Subsequently, the poling process shown in FIG. 3 is performed to complete the poled structure 10. Assuming the width between two active blocks 24 is "W", the period (Λ) of the inverted domain 30 is $$\text{``}\frac{1}{3}W\text{''}$$

In contrast, the period (Λ) of inverted domain would be "W" if the poling process was performed without inserting the two passive blocks 26 between two active blocks 24. In other words, inserting the two passive blocks 26 between two active blocks 24 can decrease the period (Λ) of the inverted domains 30.

Figure 9:
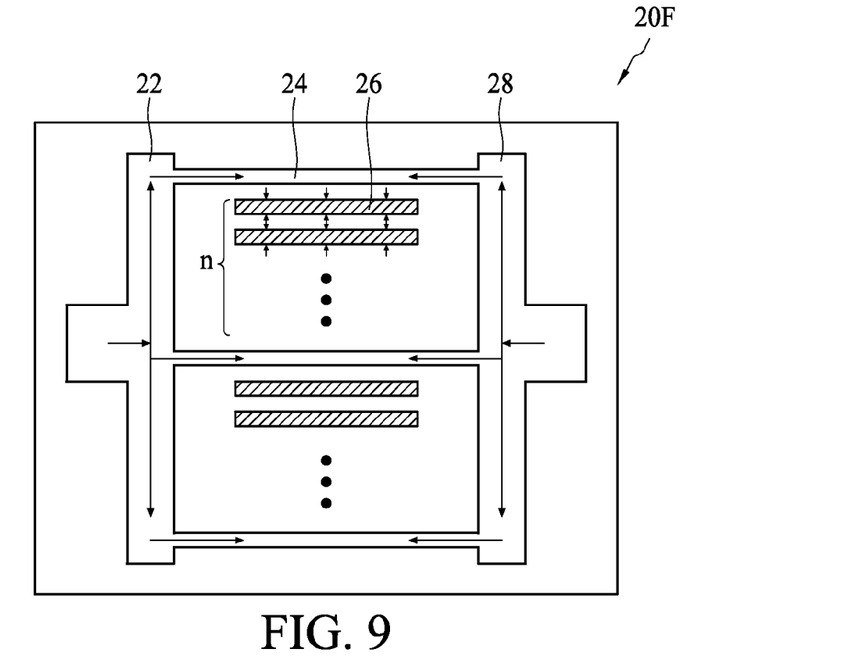
FIG. 9 illustrates a method for preparing a poled structure according to a six embodiment of the present invention.

FIG. 9 illustrates a method for preparing the poled structure 10 according to a sixth embodiment of the present invention. Compared with the fourth embodiment using the electrode-patterning process to form the first electrode structure 20D including only one passive block 26 sandwiched between two active blocks 24 as shown in FIG. 7, the six embodiment of the present invention uses the electrode-patterning process to alternatively form a first electrode structure 20F including a first body 22, a second body 28, a plurality of active blocks 24 with two ends connected to the first body 22 and the second body 28, and n number of passive blocks 26 sandwiched between two active blocks 24.

Subsequently, the poling process shown in FIG. 3 is performed to complete the poled structure 10. Assuming the width between two active blocks 24 is "W", the period (Λ) of the inverted domain 30 is $$\text{``}\frac{1}{n+1}W\text{''}.$$

In contrast, the period (Λ) of inverted domain would be $$\text{``}\frac{1}{2}W\text{''}$$

if the poling process was performed by using the first electrode structure 20B with only one passive block 26 sandwiched between two active blocks 24. In other words, inserting the n number of passive blocks 26 between two active blocks 24 can further decrease the period (Λ) of the inverted domains 30.

Figure 10:
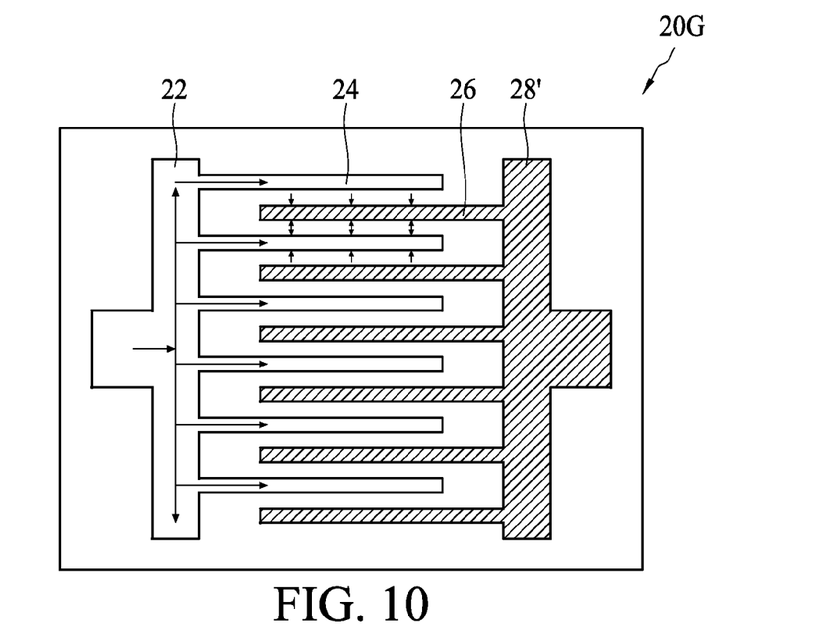
FIG. 10 to FIG. 12 illustrates a method for preparing a poled structure according to a seventh embodiment of the present invention.
Figure 11:
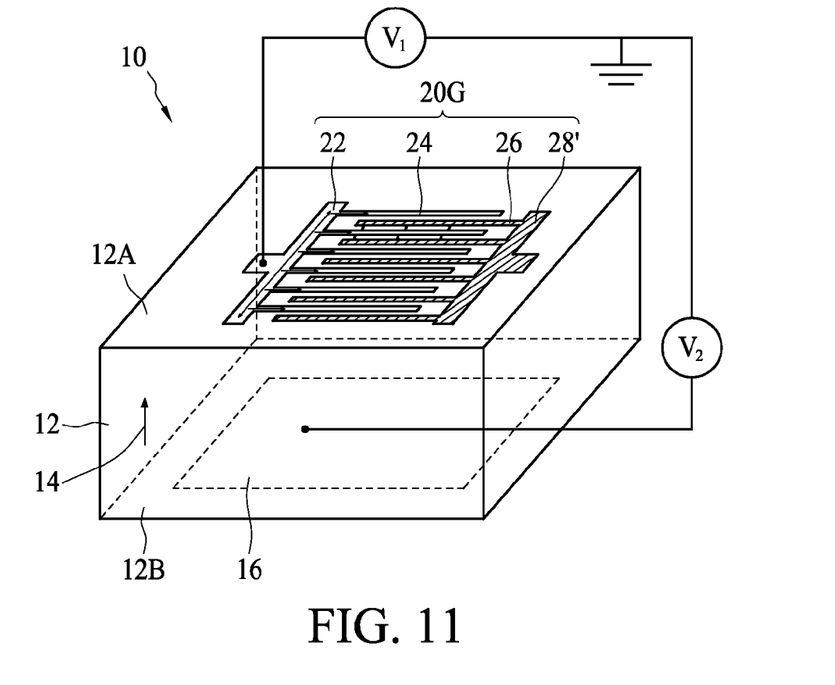
Figure 12:
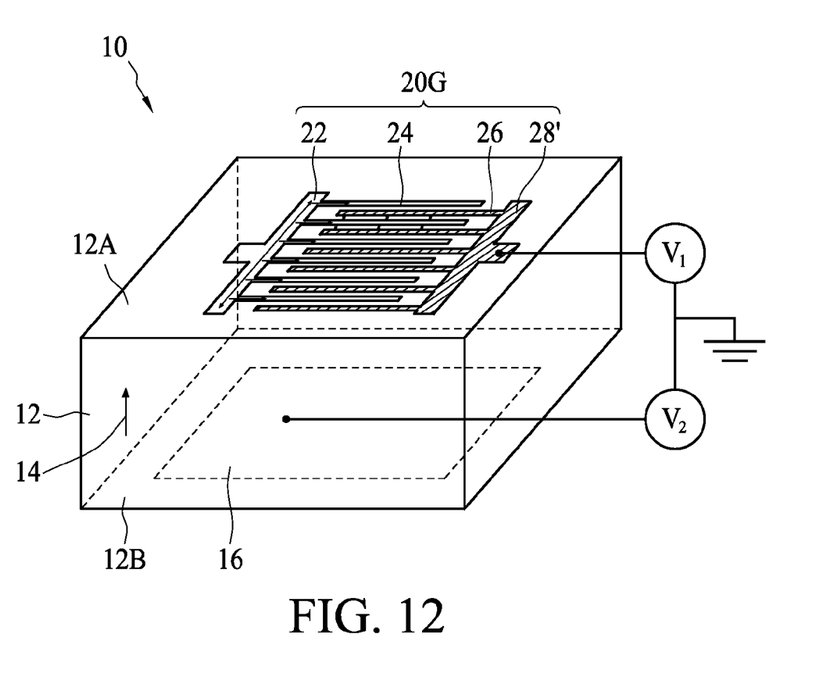

FIG. 10 to FIG. 12 illustrates a method for preparing the poled structure 10 according to a seventh embodiment of the present invention. Compared with the first embodiment using the electrode-patterning process to form the first electrode structure 20A including the passive blocks 26 with two free ends as shown in FIG. 2, the seventh embodiment of the present invention uses the electrode-patterning process to alternatively form a first electrode structure 20G including a first body 22, a plurality of active blocks 24 with one end connected to the first body 22, a second body 28' and a plurality of passive blocks 26 with one end connected to the second body 28'. In particular, the passive blocks 26 and the active blocks 24 are positioned in an interlaced manner.

Referring to FIG. 11, a first poling phase of the poling process is performed by applying the first voltage (V₁) to the active blocks 24 via the first body 22 and a second voltage (V₂) to the second electrode structure 16 and by floating the passive blocks 26. Consequently, leakage current or tunnel current is generated from the active blocks 24 to the passive blocks 26. A second poling phase of the poling process is then performed by applying the first voltage (V₁) to the passive blocks 26 via the second body 28' and a second voltage (V₂) to the second electrode structure 16 and by floating the active blocks 24, as shown in FIG. 12. Consequently, leakage current or tunnel current is generated from the passive blocks 26 to the active blocks 24.

In particular, the applied voltage or duration in the first phase is designed to be different from that in the second phase such that the amount of charges delivered to the active blocks 24 in the first phase is different from that delivered to the passive blocks 26 in the second phase. For example, the first voltage is the same as the second voltage and the duration of the first poling phase is different from that of the second poling phase, or the duration of the first poling phase is the same as the first poling phase and the first voltage is different from the second voltage.

In particular, the introduction of the second body 28' connecting one end of the passive blocks 26 can ensure these passive blocks 26 have the same electric voltage during the poling process such that a more uniform electric field distribution can be generated for inverting the polarization direction of the ferroelectric substrate 12. In addition, assuming the width between two active blocks 24 is "W", the period (Λ) of the inverted domain 30 is $$\text{``}\frac{1}{2}W\text{''}.$$

In contrast, the period (Λ) of inverted domain would be "W" if the poling process was performed without inserting the passive block 26 between two active blocks 24. In other words, inserting the passive block 26 between two active blocks 24 can decrease the period (Λ) of the inverted domains 30.

Figure 13:
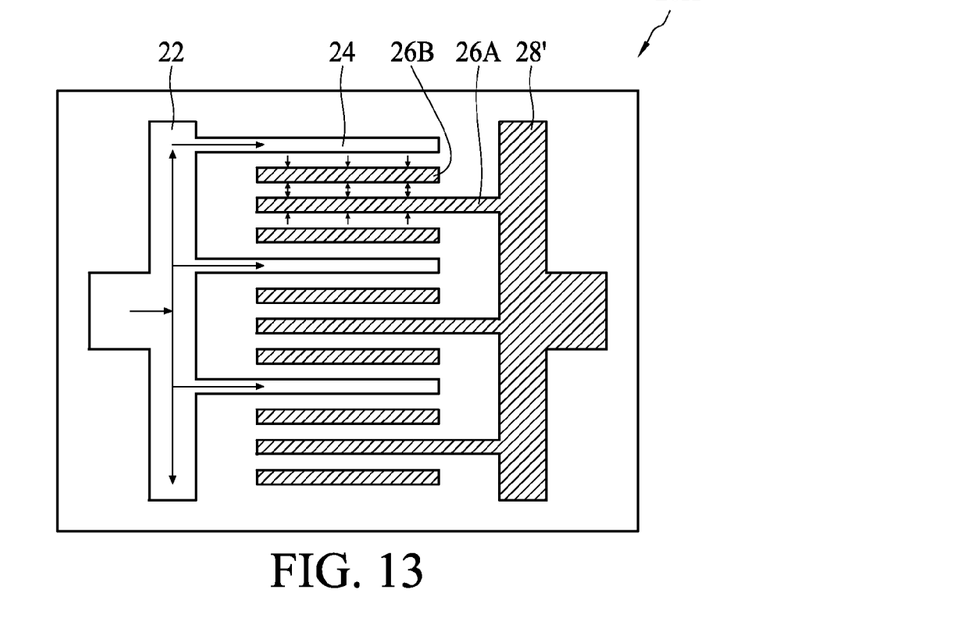
FIG. 13 illustrates a method for preparing a poled structure according to an eighth embodiment of the present invention.

FIG. 13 illustrates a method for preparing the poled structure 10 according to an eighth embodiment of the present invention. Compared with the seventh embodiment using the electrode-patterning process to form the first electrode structure 20G with the passive blocks 26 and the active blocks 24 positioned in an interlaced manner as shown in FIG. 10, the eighth embodiment of the present invention uses the electrode-patterning process to alternatively form a first electrode structure 20H including a first body 22, a plurality of active blocks 24 with one end connected to the first body 22, a second body 28', a plurality of connected passive blocks 26A with one end connected to the second body 28', and a plurality of isolated passive blocks 26B with at least one isolated passive block 26B sandwiched between one connected passive block 26A and one active block 24. Subsequently, the poling process shown in FIG. 3 (or FIG. 11 and FIG. 12) is performed to complete the poled structure 10.

The first electrode structure 20G with the passive blocks 26 and the active blocks 24 positioned in an interlaced manner shown in FIG. 10 can be used to prepare the poled structure 10 with the period (Λ) of the inverted domain 30 being $$"\frac{1}{2}W".$$

In contrast, the first electrode structure 20H shown in FIG. 13 additionally introduces one isolated passive block 26B between one connected passive block 26A and one active block 24 to decrease the width and the period (Λ) of the inverted domains 30. In particular, assuming the width between two active blocks 24 is "W", the period (Λ) of the inverted domain 30 is $$"\frac{1}{4}W"$$

according to the eighth embodiment due to the insertion of one isolated passive block 26B between one connected passive block 26A and one active block 24.

Figure 14:
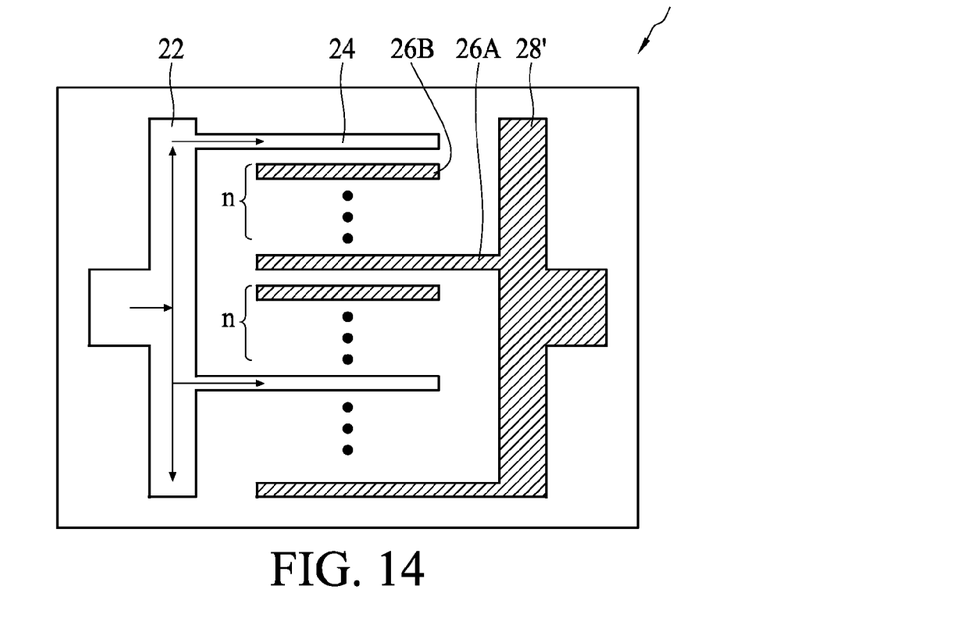
FIG. 14 illustrates a method for preparing a poled structure according to a ninth embodiment of the present invention.

FIG. 14 illustrates a method for preparing the poled structure 10 according to a ninth embodiment of the present invention. Compared with the seventh embodiment using the electrode-patterning process to form the first electrode structure 20G with the passive blocks 26 and the active blocks 24 positioned in an interlaced manner as shown in FIG. 10, the ninth embodiment of the present invention uses the electrode-patterning process to alternatively form a first electrode structure 20I including a first body 22, a plurality of active blocks 24 with one end connected to the first body 22, a second body 28', a plurality of connected passive blocks 26A with one end connected to the second body 28', and a plurality of isolated passive blocks 26B with n number of isolated passive blocks 26B sandwiched between one connected passive block 26A and one active block 24. Subsequently, the poling process shown in FIG. 3 (or FIG. 11 and FIG. 12) is performed to complete the poled structure 10.

The first electrode structure 20G with the passive blocks 26 and the active blocks 24 positioned in an interlaced manner shown in FIG. 10 can be used to prepare the poled structure 10 with the period (Λ) of the inverted domain 30 being $$"\frac{1}{2}W".$$

In contrast, the first electrode structure 20G shown in FIG. 14 additionally introduces n number of isolated passive blocks 26B between one connected passive block 26A and one active block 24 to decrease the width and the period (Λ) of the inverted domains 30. In particular, assuming the width between two active blocks 24 is "W", the period (Λ) of the inverted domain 30 is $$"\frac{1}{n+1}W"$$

according to the ninth embodiment due to the insertion of n number of isolated passive block 26B between one connected passive block 26A and one active block 24.

Figure 15:
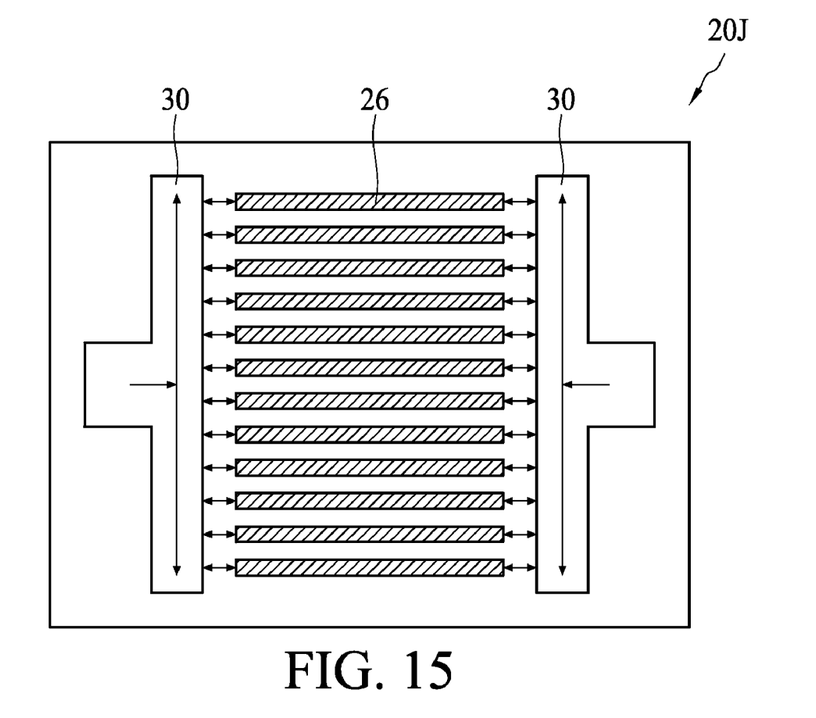
FIG. 15 illustrates a method for preparing a poled structure according to a tenth embodiment of the present invention.

FIG. 15 illustrates a method for preparing the poled structure 10 according to a tenth embodiment of the present invention. Compared with the first embodiment using the electrode-patterning process to form the first electrode structure 20A including the active blocks 24 with one end connected to the first body 22 as shown in FIG. 2, the tenth embodiment of the present invention uses the electrode-patterning process to alternatively form a first electrode structure 20J including two active bodies 30 and a plurality of passive blocks 26 with two free ends facing the two active blocks 30. In particular, the first electrode structure 20J does not have an active block with one end connected to the active bodies 30. Subsequently, the poling process shown in FIG. 3 (or FIG. 11 and FIG. 12) is performed to complete the poled structure 10.

Figure 16:
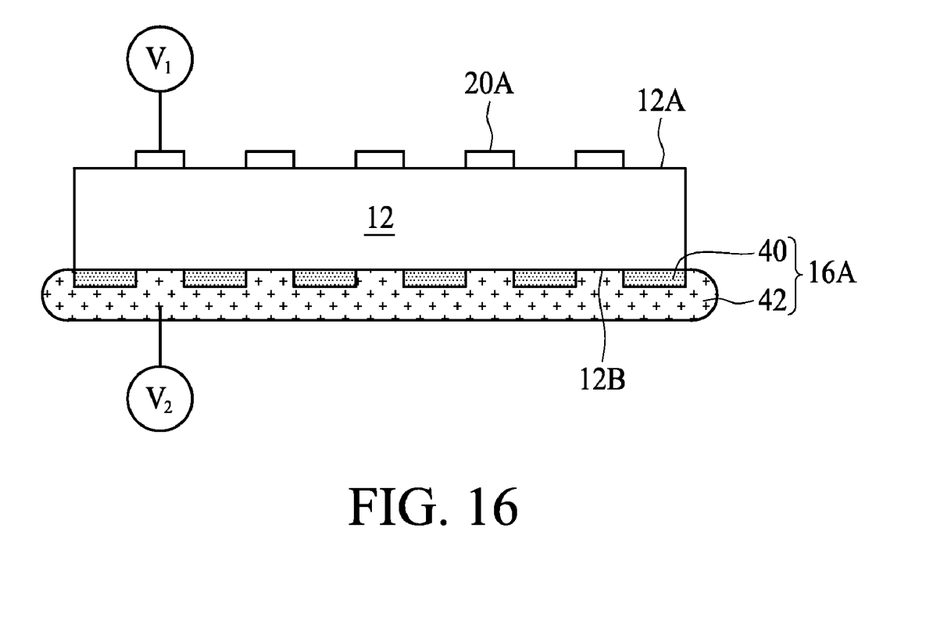
FIG. 16 illustrates a second electrode structure according to one embodiment of the present invention.

FIG. 16 illustrates a second electrode structure 16A according to one embodiment of the present invention. The second electrode structure 16A includes a plurality of insulators 40 on the second surface 12B and a conductor 42 such as conductive liquid or metal. To perform the poling process, the first voltage ($V_1$) is applied to the first electrode structure 20A on the first surface 12A, and the second voltage ($V_2$) is applied to the conductor 42 of the second electrode structure 16A.

Figure 17:
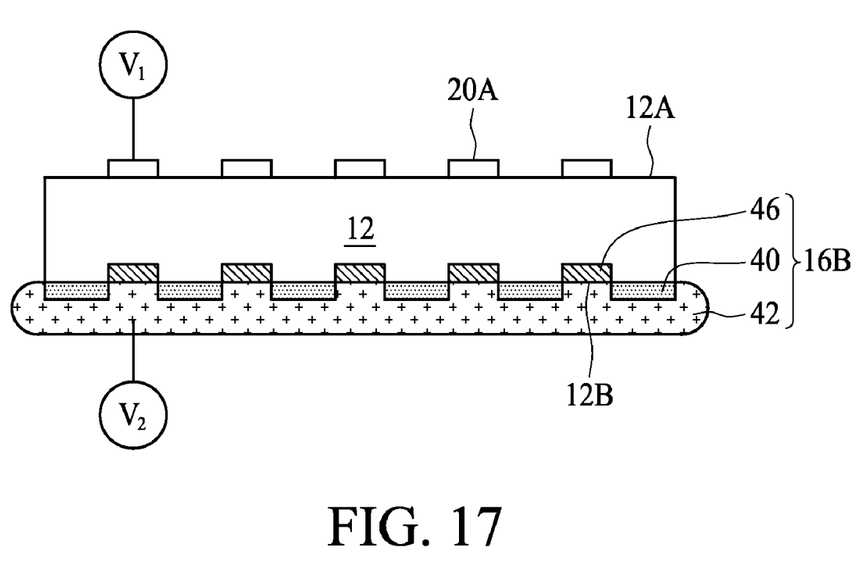
FIG. 17 illustrates a second electrode structure according to another embodiment of the present invention.

FIG. 17 illustrates a second electrode structure 16B according to another embodiment of the present invention. The second electrode structure 16B includes a plurality of conductive regions 46 such as the proton-exchange region in the bottom portion of the ferroelectric substrate 12, a plurality of insulators 40 positioned on the second surface 12B and a conductor 42 such as conductive liquid or metal. To perform the poling process, the first voltage ($V_1$) is applied to the first electrode structure 20A on the first surface 12A, and the second voltage ($V_2$) is applied to the conductor 42 of the second electrode structure 16A.

In addition, the second electrode structure 16 on the second surface 12B of the ferroelectric substrate 12 can be conductors of variety, as shown in U.S. patent application Ser. Nos. 11/619,021, 11/465,681, 11/557,907, and 11/861,874. These applications are incorporated herein by reference.

The above-described embodiments of the present invention are intended to be illustrative only. Numerous alternative embodiments may be devised by those skilled in the art without departing from the scope of the following claims.

What is claimed is:

1. A method for preparing a poled structure, comprising the steps of:

forming a ferroelectric substrate with a first polarization direction, and the ferroelectric substrate having a first surface and a second surface;

performing an electrode-patterning process to form a first electrode structure on the first surface, the first electrode structure including a plurality of active blocks and a plurality of passive blocks, wherein at least one passive block is sandwiched between two active blocks; and performing a poling process including applying a first voltage to the active blocks and the passive blocks being floated such that a current is generated from the active blocks to the passive blocks to form a plurality of inverted domains with a second polarization direction in the ferroelectric substrate.

2. The method for preparing a poled structure as claimed in claim 1, wherein the step of performing an electrode-patterning process includes forming a first body and a second body, and the active blocks have two ends connected to the first body and the second body.

3. The method for preparing a poled structure as claimed in claim 2, wherein the step of performing an electrode-patterning process includes forming two passive blocks sandwiched between two active blocks.

4. The method for preparing a poled structure as claimed in claim 2, wherein the step of performing an electrode-patterning process includes forming at least two passive blocks sandwiched between two active blocks.

5. The method for preparing a poled structure as claimed in claim 1, wherein the step of performing an electrode-patterning process includes forming a first body connecting the active blocks and a second body connecting the passive blocks.

6. The method for preparing a poled structure as claimed in claim 1, wherein the step of performing an electrode-patterning process includes forming a first body connecting the active blocks, a second body connecting a plurality of connected passive blocks, and at least one isolated passive block is sandwiched between one connected passive block and one active block.

7. The method for preparing a poled structure as claimed in claim 1, wherein the step of performing an electrode-patterning process includes forming a first body connecting the active blocks, a second body connecting a plurality of connected passive blocks, and a plurality of isolated passive blocks sandwiched between one connected passive block and one active block.

8. The method for preparing a poled structure as claimed in claim 1, wherein the step of performing an electrode-patterning process forms the active blocks on the first surface in an equally-spaced manner.

9. The method for preparing a poled structure as claimed in claim 1, wherein the step of performing an electrode-patterning process forms the active blocks on the first surface in a strip-shaped manner.

10. The method for preparing a poled structure as claimed in claim 1, wherein the step of performing an electrode-patterning process forms the passive blocks on the first surface in an equally-spaced manner.

11. The method for preparing a poled structure as claimed in claim 1, wherein the step of performing an electrode-patterning process forms the passive blocks on the first surface in a strip-shaped manner.

12. The method for preparing a poled structure as claimed in claim 1, wherein the step of performing an electrode-patterning process forms a second electrode structure on the second surface.

13. The method for preparing a poled structure as claimed in claim 12, wherein the poling process including applying the first voltage to the active blocks and a second voltage to the second electrode structure.

14. The method for preparing a poled structure as claimed in claim 1, wherein the current generated from the active blocks to the passive blocks is a leakage current or a tunnel current.

15. The method for preparing a poled structure as claimed in claim 1, wherein the poling process includes:
performing a first poling phase by applying the first voltage to the active blocks, and the passive blocks being floated; and
performing a second poling phase by applying a second voltage to the passive blocks and the active blocks being floated.

16. The method for preparing a poled structure as claimed in claim 15, wherein the amount of charges delivered to the active blocks in the first phase is different from that delivered to the passive blocks in the second phase.

17. A method for preparing a poled structure, comprising the steps of:
forming a ferroelectric substrate with a first polarization direction, wherein the ferroelectric substrate has a first surface and a second surface;
performing an electrode-patterning process to form a first electrode structure on the first surface, the first electrode structure including at least two active bodies and a plurality of passive blocks with two free ends facing the two active bodies; and
performing a poling process including applying a first voltage to the active bodies and the passive blocks being floated such that a current is generated from the active bodies to the free ends of the passive blocks to form a plurality of inverted domains with a second polarization direction in the ferroelectric substrate.

18. The method for preparing a poled structure as claimed in claim 17, wherein the step of performing an electrode-patterning process forms the passive blocks on the first surface in an equally-spaced manner.

19. The method for preparing a poled structure as claimed in claim 17, wherein the step of performing an electrode-patterning process forms the passive blocks on the first surface in a strip-shaped manner.

20. The method for preparing a poled structure as claimed in claim 17, wherein the step of performing an electrode-patterning process including forming a second electrode structure on the second surface.

21. The method for preparing a poled structure as claimed in claim 20, wherein the poling process including applying the first voltage to the active bodies and a second voltage to the second electrode structure.

22. The method for preparing a poled structure as claimed in claim 17, wherein the current generated from the active bodies to the passive blocks is a leakage current or a tunnel current.

23. The method for preparing a poled structure as claimed in claim 17, wherein the poling process includes:
performing a first poling phase by applying the first voltage to the active blocks, and the passive blocks being floated; and
performing a second poling phase by applying a second voltage to the passive blocks and the active blocks being floated.

24. The method for preparing a poled structure as claimed in claim 23, wherein the amount of charges delivered to the active blocks in the first phase is different from that delivered to the passive blocks in the second phase.

* * * * *